United States Patent
Huang

(10) Patent No.: US 6,173,060 B1
(45) Date of Patent: Jan. 9, 2001

(54) VOICE-CONTROLLED TIMING AND CALCULATING DEVICE

(76) Inventor: Hsien-Ting Huang, 1F., No. 18, Alley 101, Lane 122, Jui-Kuang Rd., Nei-Hu Area, Taipei (TW)

( * ) Notice: Under 35 U.S.C. 154(b), the term of this patent shall be extended for 0 days.

(21) Appl. No.: 09/096,136

(22) Filed: Jun. 11, 1998

(51) Int. Cl.[7] .............................. H03G 3/20; H04R 3/00; G10L 11/00
(52) U.S. Cl. .................... 381/110; 704/270; 704/275; 368/10; 368/63; 708/105; 708/111
(58) Field of Search .................... 381/110; 367/197, 367/198, 199; 704/270, 271, 272, 275, 277; 368/10, 63; 708/105, 111, 112, 172; 434/169

(56) References Cited

U.S. PATENT DOCUMENTS

| | | | |
|---|---|---|---|
| 3,999,050 | * | 12/1976 | Pitroda ................................ 708/112 |
| 4,120,040 | * | 10/1978 | Aihara ................................. 364/709 |
| 4,149,257 | * | 4/1979 | Nakagiri et al. ...................... 368/10 |
| 4,189,912 | * | 2/1980 | Washizuka et al. ................... 368/10 |
| 4,240,150 | * | 12/1980 | Ebihara et al. ....................... 368/10 |
| 4,257,115 | * | 3/1981 | Hatuse et al. ........................ 368/10 |
| 4,300,204 | * | 11/1981 | Maeda et al. ......................... 368/10 |
| 4,379,640 | * | 4/1983 | Inoue .................................... 368/63 |
| 4,408,096 | * | 10/1983 | Washizuka et al. ................. 704/275 |
| 4,573,134 | * | 2/1986 | Ikemoto ............................... 704/275 |
| 4,707,794 | * | 11/1987 | Hashimoto et al. ................. 708/111 |
| 4,882,685 | * | 11/1989 | Van Der Lely ...................... 704/275 |
| 5,050,138 | * | 9/1991 | Yamada et al. ........................ 368/10 |
| 5,444,673 | * | 8/1995 | Mathurin ............................. 704/275 |
| 5,448,532 | * | 9/1995 | Kataoka et al. ....................... 368/10 |
| 5,602,963 | * | 2/1997 | Bissonnette et al. ............... 704/275 |
| 5,794,205 | * | 8/1998 | Walters et al. ...................... 704/205 |
| 6,015,224 | * | 1/2000 | Greenstein ......................... 708/111 |

FOREIGN PATENT DOCUMENTS

2806429 * 10/1978 (DE) .................................... 704/275

* cited by examiner

*Primary Examiner*—Forester W. Isen
*Assistant Examiner*—Xu Mei

(57) ABSTRACT

A voice-controlled timing and calculating device includes a microphone to receive a user's vocal signal, a voice amplifier amplifying the vocal signal, a comparison circuit comparing the vocal signal with information stored in a memory to retrieve an associated instruction, a processor performing the instruction of serving as a timer or a calculator to generate a result, and a voice synthesizer which converts the result from the processor into a synthetic voice which is then broadcast by a speaker so that the device may be operated with vocal input and vocal output. Further, the device may be provided with visual display to show the result of the processor. Also, a manually actuateable switch may be provided to allow a user to alternatively switch the processor between the timer and the calculator.

15 Claims, 2 Drawing Sheets

VOICE-CONTROLLED TIMING AND CALCULATING DEVICE

FIELD OF THE INVENTION

The present invention relates generally to a voice controlled timing and calculating device and in particular to a timing and calculating device which receives input in vocal form to perform calculation and timing operations and also provides output in vocal so that no actuation of pushbuttons or keys is needed and a more user-friendly environment may be obtained especially for the visually disabled people.

BACKGROUND OF THE INVENTION

Conventional calculators or computing devices are usually provided with keys or push buttons to serve as a user-interface, allowing the user to input the desired instruction and/or data. Such an arrangement is quite inconvenient for users who have to key in a number of digits to perform a number of operations have to switch their eye sights between the calculator keys and the list of the figures to be keyed in. Furthermore, such a computing device is in general not user-friendly to the visually disabled people.

On the other hand, timing devices, such as electronic watch, is also controlled by means of pushbuttons, especially in setting the time on the timing device. This is of course to some extent inconvenient for users, especially in a dark environment. Certainly, it is not user-friendly for the visually disabled people.

Thus, it is desirable to provide a voice-controlled timing and calculating device of which the input and output may be performed vocally so as to overcome the problems encountered in the prior art.

SUMMARY OF THE INVENTION

Therefor, an object of the present invention is to provide a voice-controlled timing and calculating device which receives vocal inputs from a user to perform the desired operation and then provides output in both visual and vocal forms.

Another object of the present invention is to provide a voice-controlled timing and calculating device which allows a user to operate the device without hand touching the device.

To achieve the above objects, in accordance with the present invention, there is provided a voice-controlled timing and calculating device comprising a microphone to receive a user's vocal signal, a voice amplifier amplifying the vocal signal, a comparison circuit comparing the vocal signal with information stored in a memory to retrieve an associated instruction, a processor performing the instruction of serving as a timer or a calculator to generate a result, and a voice synthesizer which converts the result from the processor into a synthetic voice which is then broadcast by a speaker so that the device may be operated with vocal input and vocal output. Further, the device may be provided with visual display to show the result of the processor. Also, a manually actuateable switch may be provided to allow a user to alternatively switch the processor between the timer and the calculator.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

Figure 1:
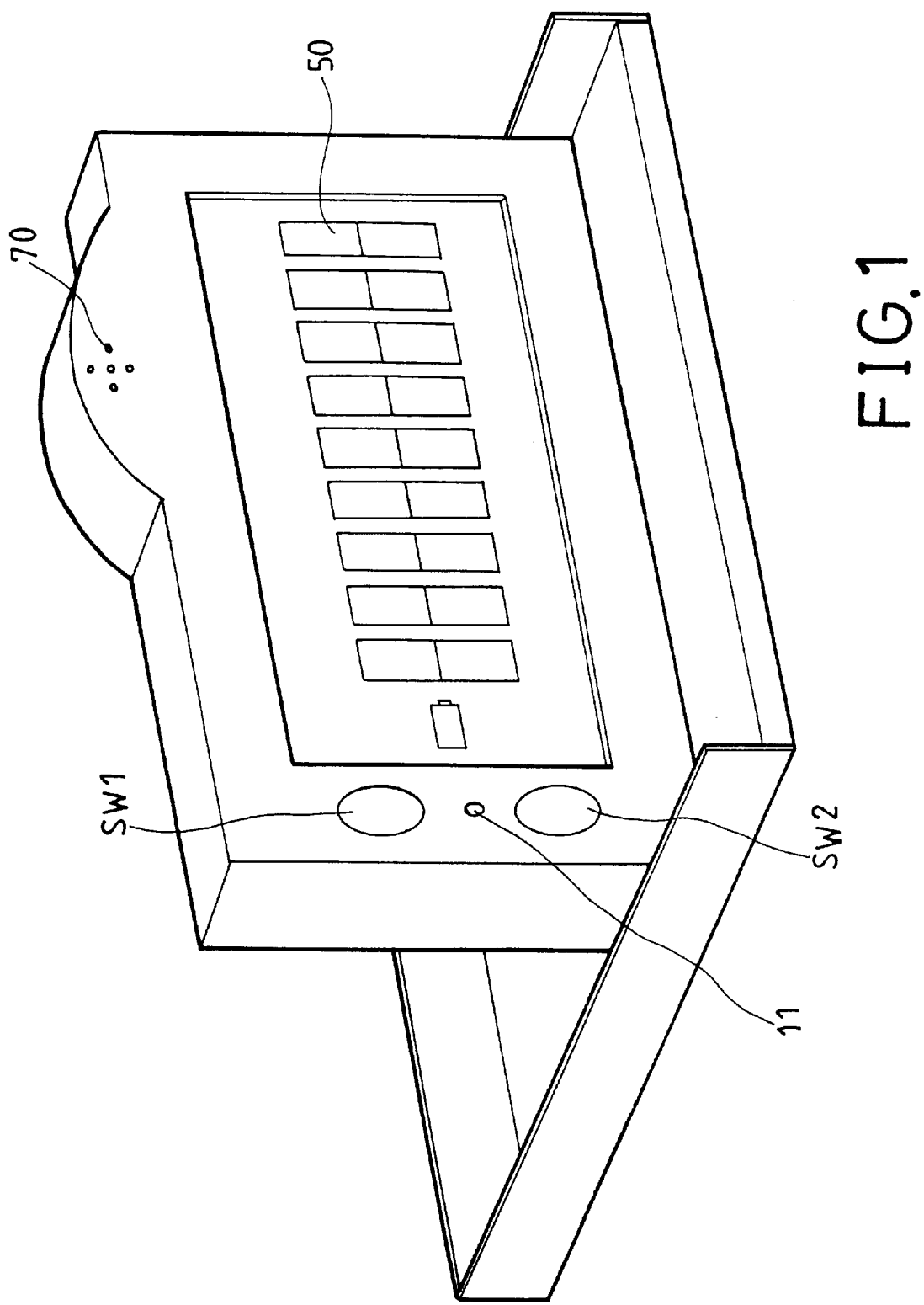
FIG. 1 is a perspective view showing a voice-controlled timing and calculating device constructed in accordance with a preferred embodiment of the present invention.

With reference to the drawings and in particular to FIG. 1, wherein a voice-controlled timing and calculating device constructed in accordance with the present invention is shown, the voice-controlled timing and calculating device of the present invention comprises a casing inside which a circuit (see FIG. 2), preferably in the form of a printed circuit board, is disposed. The circuit performs two major tasks, calculation and timing, which may be manually switched by actuating switch SW1 provided on the casing. A second switch SW2 is provided to allow user to manually set the timer function of the circuit.

A microphone 11 is provided on the casing and in electrical connection with the circuit for transmitting user's vocal instruction or input to the circuit. A display 50 is provided in connection with the circuit to visually display desired information, such as the result of arithmetic calculation operation or the current time. Also, a speaker 70 is provided in connection with the circuit to broadcast the output, such as the result of arithmetic operation or time, of the device.

Figure 2:
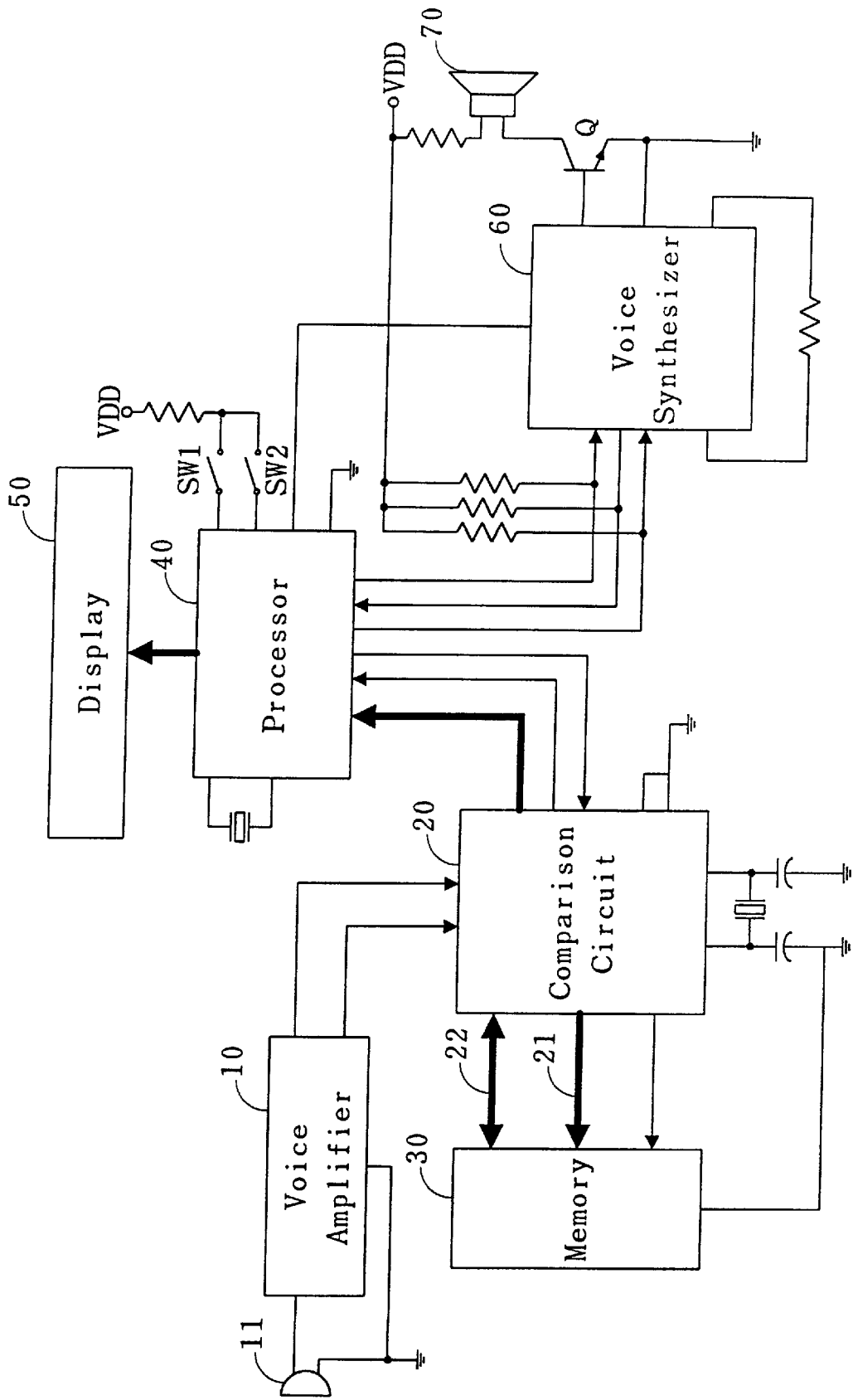
FIG. 2 is a circuit diagram of the voice-controlled timing and calculating device of the present invention.

With reference to FIG. 2, the circuit of the voice-controlled timing and calculating device of present invention comprises a voice amplifier 10 which amplifies the user's vocal signal received at the microphone 11 and provides an amplified signal to a comparison circuit 20 which may be in the form of an IC (integrated circuit). The comparison IC 20 compares the amplified vocal signal with information stored in a memory 30 to determine the meaning of the vocal signal and thus obtain a machine meaningful signal which includes instruction and/or data form the information stored in the memory 30 via address bus 21. The machine meaningful signal so retrieved from the memory 30 by the comparison circuit 20 is transferred to a processor 40 via data bus 22.

In accordance with a preferred embodiment of the present invention, a training process may be conducted at the first time when the voice-controlled timing and calculating device is used. By performing the training process, the user may store his or her voice in the memory 30 so that at the next use of the voice-controlled timing and calculating device, the comparison IC 20 may perform a correct comparison between the received vocal signal and the user's voice that is stored in the memory 30 and thus a correct operation may be performed.

Alternatively, the voice information that is stored in the memory 30 may be built therein in advance by means of electronic coding process. (The electronic coding technique is well known and constitutes no novel part of the present invention so that no detail is needed herein.) 4Jnder this situation, no training process is needed.

The processor 40 that receives the machine meaningful signal via the data bus 22 performs the desired operation, such as arithmetic operation or timing operation, instructed by the signal. The result of the processor 40 is output to the display 50 which may be a liquid crystal display and a voice synthesizer IC 60 that generates synthetic voice to be broadcast by the speaker 70 so that the operation result of the processor 40 is displayed both visually and vocally. As mentioned above, the switch SW1 which performs switching operation between the timing function and the calculating function of the processor 40 is connected to the processor 40 to allow the user to manually switch between these two functions. The switch SW2 that allows the user to perform timer setting operation is also in connection with the processor 40.

The voice synthesizer IC 60 that converts the operation result of the processor 40 into synthetic voice is in connection with the speaker 70 via a transistor Q which amplifies the output of voice synthesizer IC 60 to provide a suitable signal to the speaker 70.

Although in the preferred embodiment illustrated in FIG. 1, the voice-controlled timing and calculating device of the present invention is embodied in a rectangular casing, it is also possible to use a different outline of the timing and calculating device, such as a pen so that the pen, besides the writing function, also provides the functions of calculator and timer.

The operation of the voice-controlled timing and calculating device is rather straightforward. For example, in powering on, the device checks if there is built-in information in the memory 30. If there is no such information, then in order to properly understand the user's voice signal, a training process has to be conducted. The training process allows the user to store the instructions and data which are needed in the subsequent operation of the voice-controlled timing and calculating device in the memory 30. Those instructions/data may include "calculator", "timer", digits 0–9, arithmetic operation symbols ("+", "−", "×", "÷") and so forth. Once these instructions/data are completely stored in the memory 30, the device may then be ready to receive instructions from the user.

When the user instructs the timing and calculating device into the timer function and actuates the timer setting switch SW2 to enter the timer setting mode, then the display 50 blinks, showing ready to receive timer setting instruction. The user may then speaks the desired digit to the microphone 11 by following the position of a cursor on the display 50. The vocal signal of the digit that is received by the microphone 11 is amplified by the voice amplifier 10 and passed to the comparison IC 20 and the processor 40 which in turn gives an instruction to show the digit on the display 50 at the position indicated by the cursor. The cursor is then moved by the processor 40 to the next position and the device is ready to receive the next digit from the user. Once the timer setting operation is completed, the device automatically goes back to the normal timing operation and shows the time on the display 50.

In the normal timing operation, the user may use the switch SW1 or give a vocal instruction through the microphone 11 to switch to the calculator function in which the user may give calculation instruction and data to perform the calculation to the device via the microphone 11. The comparison IC 20 provides the instruction and data to the processor 40 and processor 40 performs the operation once a calculation starting signal is received and provides the result to the display 50 and the voice synthesizer IC 60 so that the result may be displayed both visually and vocally.

For example, in order to perform the arithmetic operation "12×27+195=", the user may read the digit and symbol in sequence so that the microphone 11 sequentially transmits the digit and symbol to the processor 40. Once the processor 40 receives the symbol "=", it starts the calculation operation. The equal sign "=" serves as the calculation starting signal in this case.

The vocal signals to the calculator may also include additional operation instructions such as a confirm request and a correction request. If a vocal signal corresponding to a confirm request is received after a formula has been entered, the processing circuit confirms the formula by means of an output means such as a speaker. If a vocal signal corresponding to a correction request is received after a formula has been entered, the processing circuit replaces the old formula with a new formula entered afterwards by the user.

An idle time period is pre-established so that when the processor 40 in the calculator function receives no instruction for time interval greater than the idle time period, the processor 40 automatically goes back to the timer function.

Further, in order to know the time information, the user may directly observe the display 50 or alternatively, the user may give a vocal instruction, such as "time" to the device via the microphone 11 and the processor 40 may then control the speaker 70 to broadcast the current time which is synthesized in the voice synthesizer IC 60.

The present invention provides a measure that allows two functions to be performed by a single piece of device. The device of the present invention provides not only visual display but also a vocal output so that it is particularly suitable for those visually disabled people. Quite obviously, the idea of using voice as input and output means of a device may be extended to devices of other functions, such as electrical appliance for example radio, washing machine so that a more friendly environment especially for the visually disabled people may be established.

Although a preferred embodiment has been described to illustrate the present invention, it is apparent that changes and modifications in the specifically described embodiment can be carried out without departing from the scope of the invention which is intended to be limited only by the appended claims.

What is claimed is:

1. A voice-controlled timing and calculating device, comprising:

a microphone adapted to receive a vocal signal from a user;

a voice amplifier circuit which receives the vocal signal from the microphone, amplifies the vocal signal and generates an amplified signal;

a memory for storing information of operation instruction and data;

means for detecting existence of information stored in the memory;

means for establishing information into the memory in response to and based on the reception of vocal signals from a user when no existence of information is detected in the memory;

a comparsion circuit which receives the amplified signal from the voice amplifier circuit and compares the amplified signal with the information stored in the memory to retrieve a portion of the information including instructions and data corresponding to the amplified signal from the memory;

a processor circuit which receives said portion of the information including instructions and data from the comparison circuit and selectively performs a calculation operation and a timing operation in response to the instruction and based on the data of said portion of the information and provides an operation result;

a voice synthesizer circuit which receives the operation result from the processor circuit and converts the operation result into synthetic voice; and a speaker for broadcasting the synthetic voice.

2. The device as claimed in claim 1, further comprising a display which receives and visually displays the operation result.

3. The device as claimed in claim 1, further comprising a first manually actuateable switch in connection with the processor circuit to switch between the timing operation and the calculation operation.

4. The device as claimed in claim 3, further comprising a second manually actuateable switch for initiating a timer setting operation when the processor is performing a timing operation.

5. The device as claimed in claim 1, wherein said portion of the information comprises a switching instruction which instructs the processor circuit to switch between the timing operation and the calculation operation.

6. The device as claimed in claim 5, wherein the processor circuit switches said device from the calculation operation to the timing operation when the calculation operation is idle for a period longer than a predetermined calculator idle time.

7. A method for vocally setting a timer which comprises a display having a plurality of digits for displaying time and a processing circuit comprising a vocal signal receiving means which receives an external vocal signal and converts the vocal signal into an electronic signal including a timer setting instruction and numeric digits to the processing circuit, the timer setting instruction switching the processing circuit between a time display mode in which the display shows time and a timer setting mode, the method comprising the steps of:
 (a) detecting existence of information of a timer setting instruction and numeric digits stored in a memory;
 (b) establishing information of a timer setting instruction and numeric digits into the memory in response to and based on the reception of vocal signals from a user by means of the vocal signal receiving means when no existence of information is detected in the memory;
 (c) receiving a vocal signal of a timer setting instruction by means of the vocal signal receiving means according to the information of the timer setting instruction stored in the memory to switch the circuit from the time display mode to the timer setting mode;
 (d) indicating ready at a first digit of an old time;
 (e) receiving a numeric digit of a new time by means of the vocal signal receiving means according to the information of numeric digits stored in the memory and replacing a corresponding digit of the old time with said numeric digit of the new time which is vocally received;
 (f) moving to a next digit of the old time and returning to step (e) until a last digit of the old time is reached; and
 (g) resuming the time display mode.

8. The method as claimed in claim 7, wherein the vocal signal receiving means comprises a microphone adapted to receive a vocal signal from a user and a converting circuit to convert the vocal signal to the electronic signal to the processing circuit.

9. The method as claimed in claim 7, wherein the indicating step (d) comprises blinking the digit.

10. The method as claimed in claim 7, wherein the timer comprises a speaker in connection with the processing circuit and wherein the indicating step (d) comprises vocally indicating ready at the digit by means of the speaker.

11. A method for vocally operating a calculator which comprises vocal signal receiving means adapted to receive vocal signals from a user, a processing circuit for performing calculation operation instructed by the user's vocal signals and an output means to provide a result of the calculation to the user, the method comprising the steps of:
 (a) detecting existence of information of operation instruction and data stored in a memory;
 (b) establishing information of operation instruction and data into the memory in response to and based on the reception of vocal signals from a user by means of the vocal signal receiving means when no existence of information is detected in the memory;
 (c) providing a vocal signal representing a formula to be calculated to the calculator by means of the vocal signal receiving means according to the information of operation instruction and data stored in the memory to enter the formula to be calculated into the calculator;
 (d) vocally providing a start calculation signal to the calculator via the vocal signal receiving means according to the information of operation instruction and data stored in the memory to initiate the processing circuit to perform the calculation of the formula and obtain a result; and
 (e) reporting the results via the output means.

12. The method as claimed in claim 11, wherein the step (c) of providing the vocal signal to the calculator further comprises the steps of (1) vocally providing a confirm request signal to the calculator to have the processing circuit confirm the formula by means of the output means and (2) selectively vocally providing a correction request signal to the calculator to have the calculator correct the entered formula in accordance with a vocal signal of a new formula to be calculated provided following the correction request signal.

13. The method as claimed in claim 12, wherein the output means comprises a voice synthesizer in connection with the processing circuit and a speaker connected thereto.

14. The method as claimed in claim 11, wherein the vocal signal receiving means comprises a microphone adapted to receive the vocal signal from the user and a converting circuit to convert the vocal signal to an electronic signal to the processing circuit.

15. The method as claimed in claim 11, wherein the output means comprises a visual display device in connection with the processing circuit.

\* \* \* \* \*